US008118529B2

(12) United States Patent
Crane et al.

(10) Patent No.: US 8,118,529 B2
(45) Date of Patent: Feb. 21, 2012

(54) TOLERANCE ADJUSTING ATTACHMENT

(75) Inventors: Michael Crane, Oakland Township, MI (US); Martin R. Matthews, Troy, MI (US); Anthony J. Povinelli, Romeo, MI (US)

(73) Assignee: Magna International Inc., Aurora (CA)

( * ) Notice: Subject to any disclaimer, the term of this patent is extended or adjusted under 35 U.S.C. 154(b) by 331 days.

(21) Appl. No.: 12/434,790

(22) Filed: May 4, 2009

(65) Prior Publication Data
US 2009/0272865 A1   Nov. 5, 2009

Related U.S. Application Data

(60) Provisional application No. 61/126,376, filed on May 2, 2008.

(51) Int. Cl.
F16B 43/02 (2006.01)

(52) U.S. Cl. .......................................... 411/546; 411/99

(58) Field of Classification Search .................. 411/546, 411/522, 99, 104, 138, 142, 145; 362/460
See application file for complete search history.

(56) References Cited

U.S. PATENT DOCUMENTS

| | | | | |
|---|---|---|---|---|
| RE22,544 E | * | 9/1944 | Tinnerman | 411/522 |
| 5,716,178 A | * | 2/1998 | Vu | 411/85 |
| 6,126,122 A | * | 10/2000 | Ismert | 248/74.1 |
| 6,543,916 B2 | * | 4/2003 | Shirai | 362/460 |
| 6,901,638 B2 | * | 6/2005 | Itou et al. | 24/570 |
| 2002/0163216 A1 | | 11/2002 | Delavalle et al. | |

FOREIGN PATENT DOCUMENTS

DE   10253177 A1   5/2004
EP   0735284 A2   10/1996

* cited by examiner

Primary Examiner — Gary Estremsky
(74) Attorney, Agent, or Firm — Warn, Hoffman, Miller & LaLone, P.C.

(57) ABSTRACT

The present invention is a tolerance adjusting attachment which is part of a bracket member used for providing proper alignment between more than one externally visible component. The tolerance adjusting attachment has a support aperture formed as a portion of the bracket member, and an adjuster core at least partially extending through the support aperture, the adjuster core operably associated with at least one structural member for providing proper positioning of the bracket member in relation to the structural member. The present invention also includes an adjuster clip at least partially extending through and movable through a portion of the bracket member such that the position of the adjuster core is secured relative to the bracket member.

32 Claims, 11 Drawing Sheets

TOLERANCE ADJUSTING ATTACHMENT

CROSS-REFERENCE TO RELATED APPLICATIONS

This application claims the benefit of U.S. Provisional Application No. 61/126,376, filed on May 2, 2008. The disclosure of the above application is incorporated herein by reference.

FIELD OF THE INVENTION

The present invention relates to a tolerance adjusting attachment which compensates for variations in the dimensions of two adjoining components.

BACKGROUND OF THE INVENTION

Variation in the assembly of parts for an automobile is generally known, and is considered undesirable. Many different attempts have been made to compensate for the variation in dimensions of parts which occurs during various manufacturing processes. Often, reducing the variation in part dimensions increases the cost of manufacturing the part, regardless of what type of part is being manufactured, or what manufacturing process is being used.

One application where compensation for variation in part dimensions is very difficult is in the production of body panels used for automobiles. An increased amount of emphasis is placed on compensating for variation in part dimensions in body panels because body panels having a large variation in their dimensions will reduce the aesthetic appeal of the vehicle. There is space, or various "gaps," between the different body panel components, such as the doors, hood, and trunk. It is considered desirable to have the gaps of a consistent width between the hood and fenders, between the door and fenders, between components such as the trunk and rear fenders, or between other various body panels. Variation in part dimension can cause the gaps between these components to be inconsistent, as well as have an effect on how the parts are assembled.

Additionally, ensuring that the body panels are in proper alignment may have an effect on how the parts are connected to the vehicle. There are various frame members or other types of structures which the body panels are connected to, and due to variations in the dimensions of the part, providing proper alignment of the body panels may not allow the body panels to then be connected to the various frame members or other structures.

Accordingly, there exists a need for a part which can be used to compensate for the various tolerances in body panels of automobiles, and provide for consistent spacing between the panels, as well as allow for the panels to be properly aligned and connect to various structures used for supporting the body panels.

SUMMARY OF THE INVENTION

The present invention is a tolerance adjusting attachment which is part of a bracket member used for providing proper alignment between more than one externally visible component, such as two body panels for an automobile. The tolerance adjusting attachment has a support aperture formed as a portion of the bracket member, and an adjuster core at least partially extending through the support aperture, the adjuster core operably associated with at least one structural member for providing proper positioning of the bracket member in relation to the structural member. The present invention also includes an adjuster clip at least partially extending through and movable through a portion of the bracket member such that the position of the adjuster core is secured relative to the bracket member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
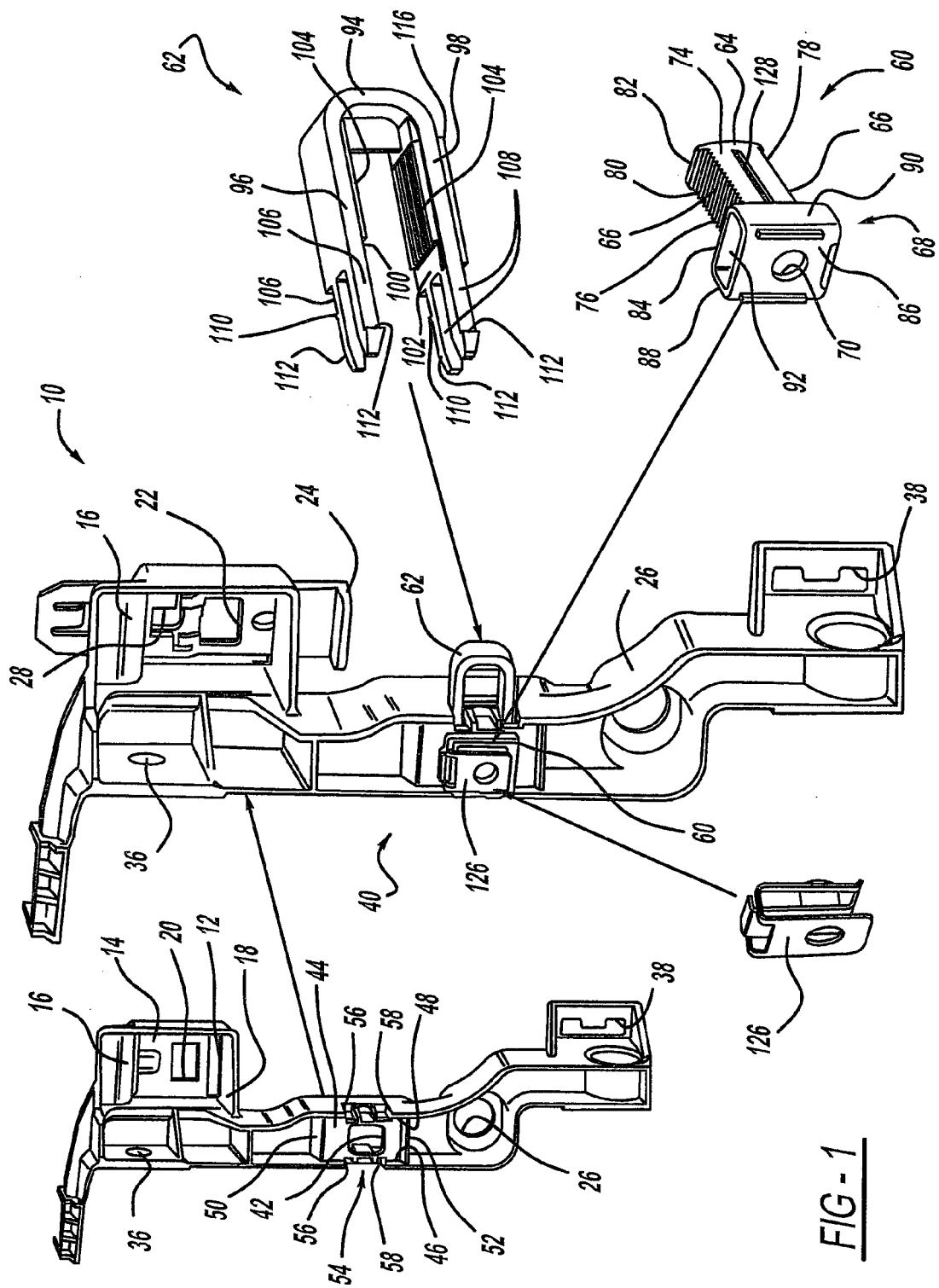
FIG. 1 is an exploded view of a bracket member having a tolerance adjusting attachment, according to the present invention.
Figure 2:
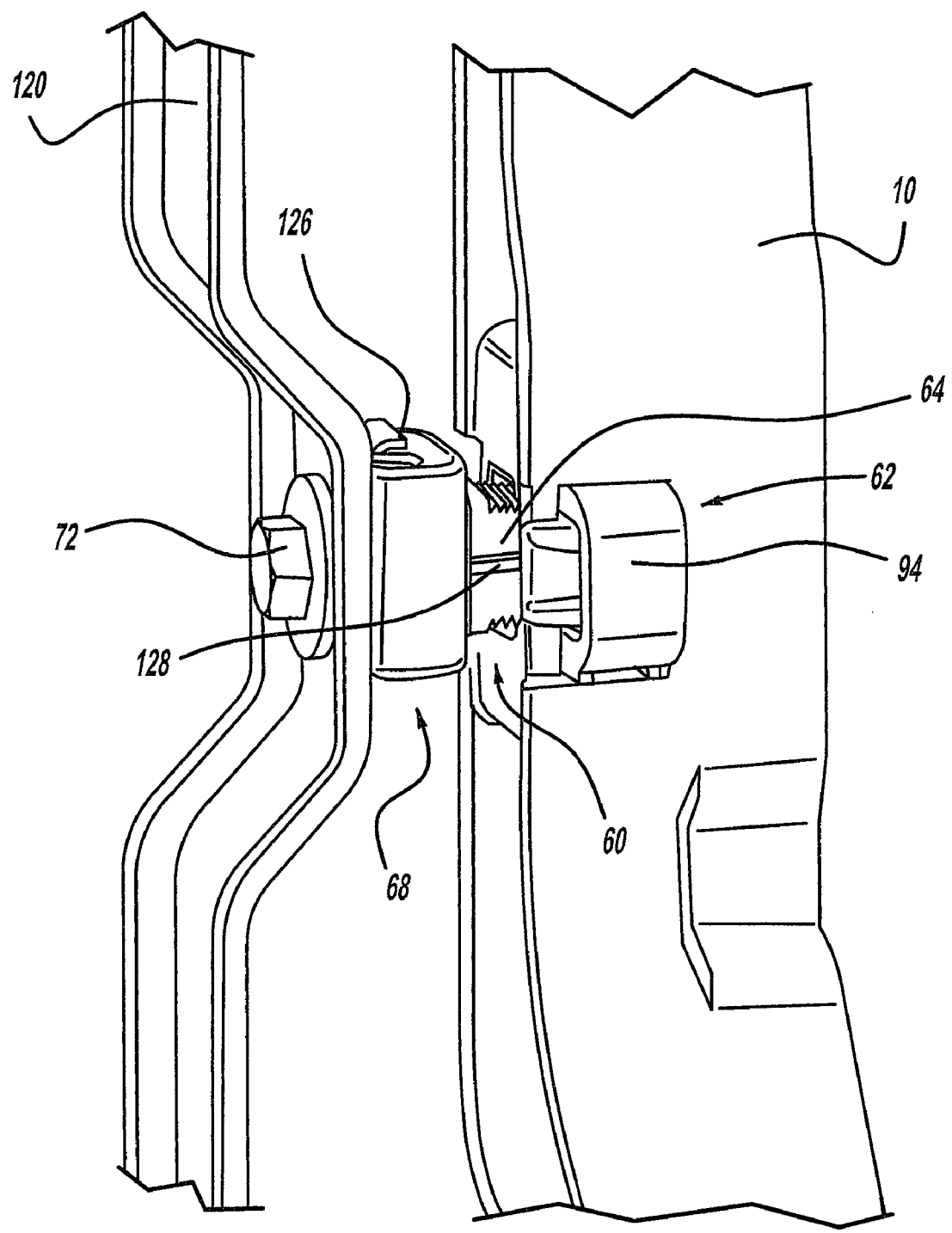
FIG. 2 is a perspective view of a bracket attached to a structural member using a tolerance adjusting attachment, according to the present invention.
Figure 3:
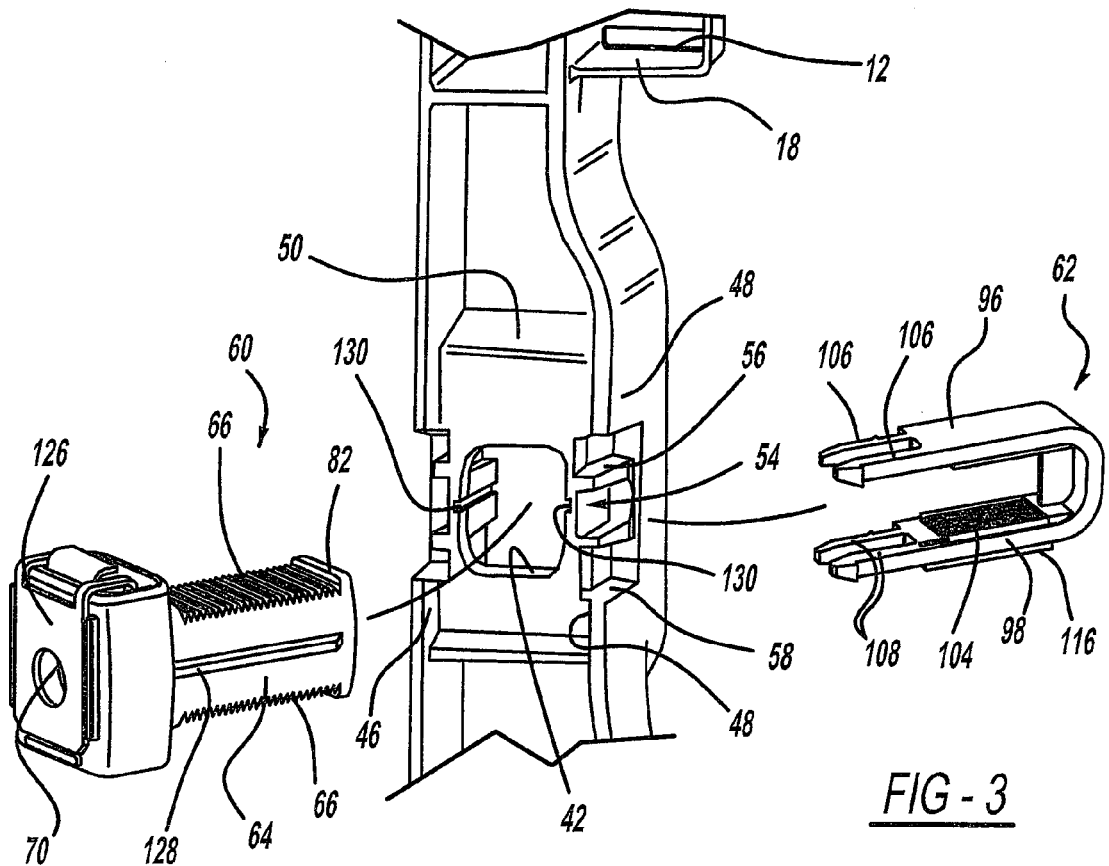
FIG. 3 is a second exploded view of a bracket member having a tolerance adjusting attachment, according to the present invention.
Figure 4:
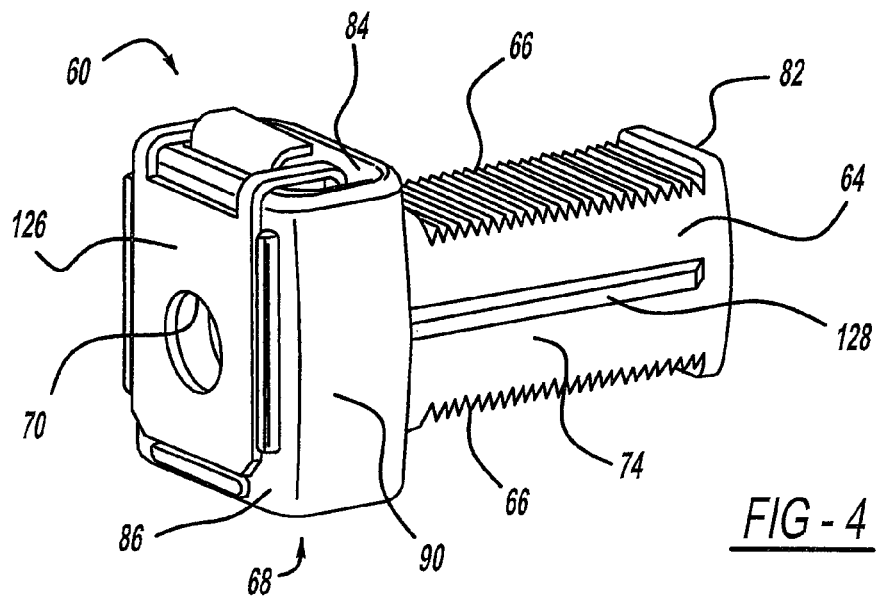
FIG. 4 is a perspective view of an adjuster core used for a tolerance adjusting attachment, according to the present invention.
Figure 5:
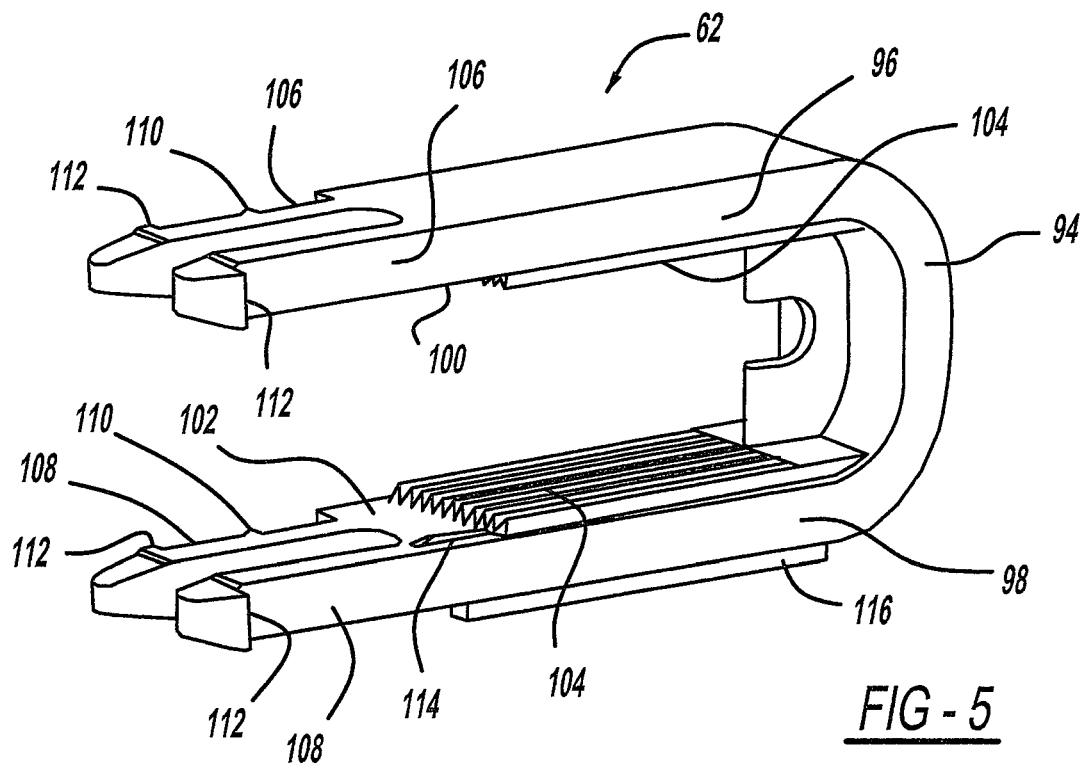
FIG. 5 is a perspective view of an adjuster clip used for a tolerance adjusting attachment, according to the present invention.
Figure 6:
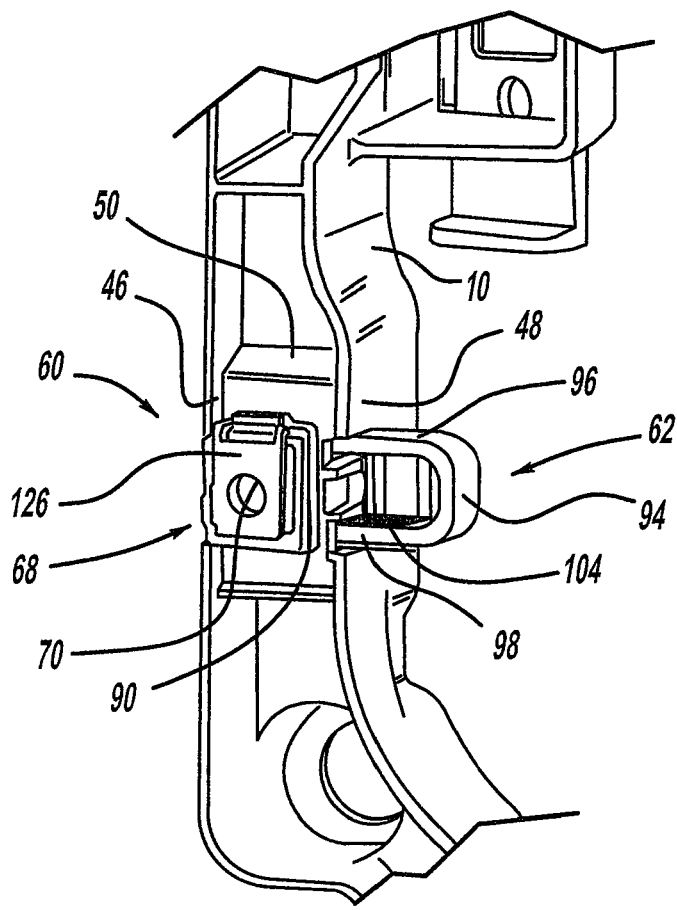
FIG. 6 is a perspective view of a tolerance adjusting attachment having an adjuster clip in a first position, according to the present invention.
Figure 7:
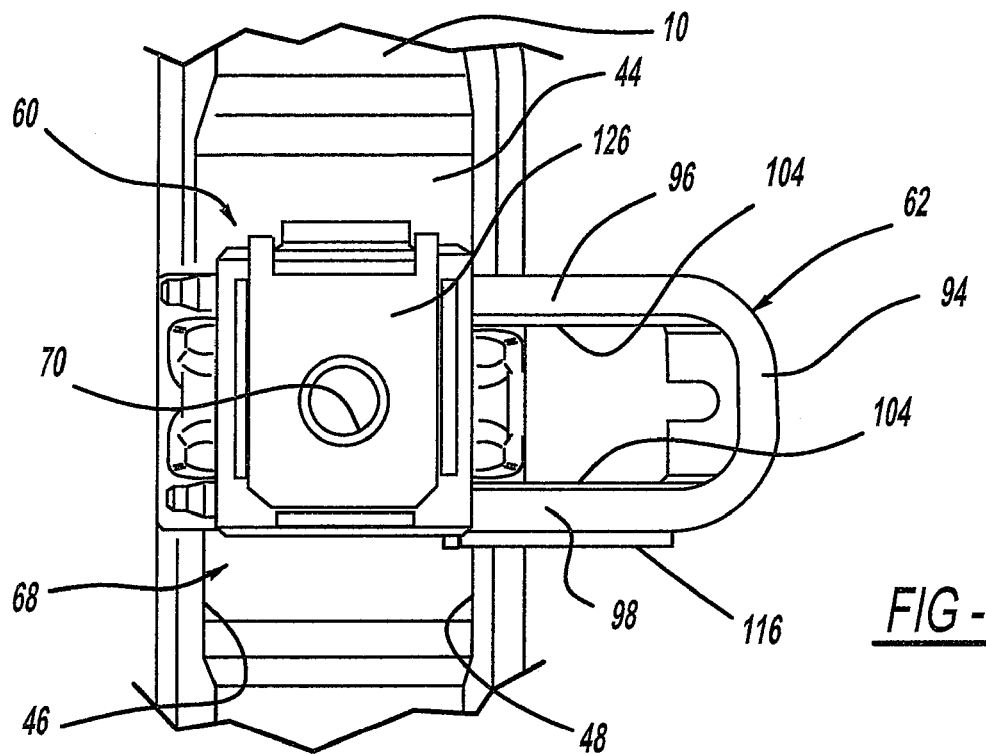
FIG. 7 is a rear view of a tolerance adjusting attachment having an adjuster clip in a first position, according to the present invention.
Figure 8:
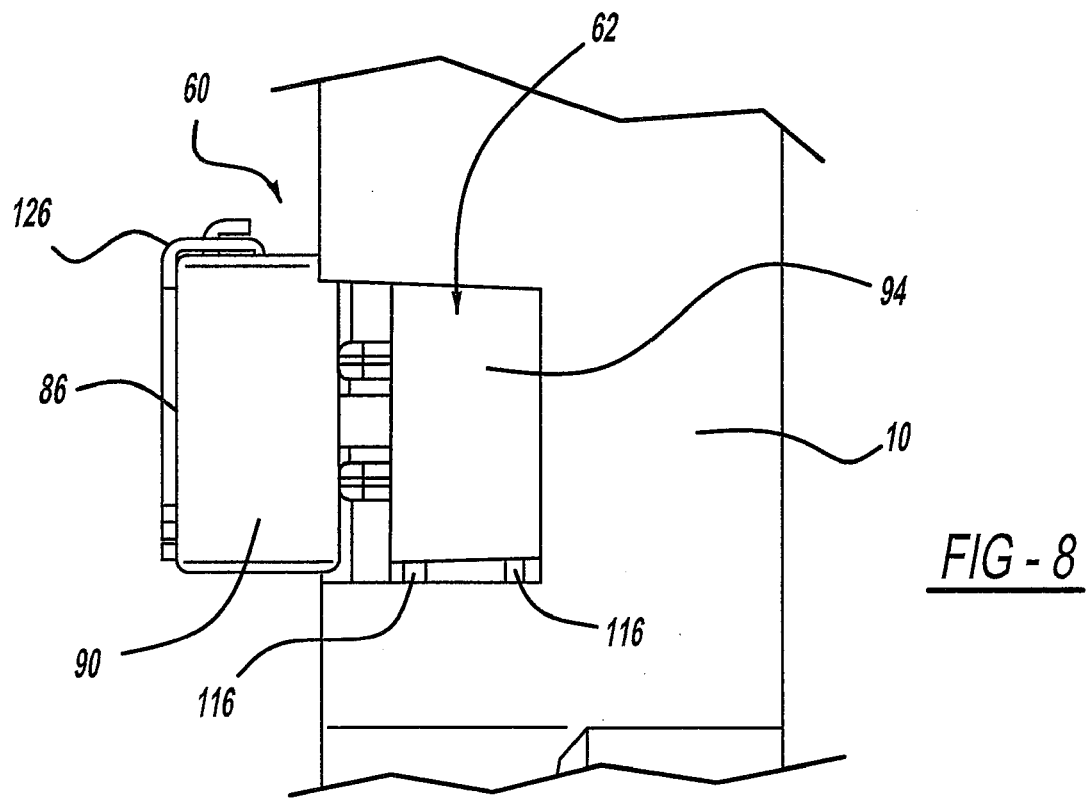
FIG. 8 is a side view of a tolerance adjusting attachment having an adjuster clip in a first position, according to the present invention.

Referring to FIG. 1, an exploded view of a tolerance adjusting attachment for a bracket member used for compensating for variation in alignment between a series of externally visible components is shown generally at 10. The bracket member 10 connects to more than one externally visible component, such as a fender (not shown) or a fascia (also not shown).

The bracket member 10 includes a first slot 12, which is formed as part of the bracket member 10, and a second slot (not shown). The slot 12 is made by a first substantially flat portion 14 which is offset from a second substantially flat portion 16 and an extension 18. The first flat portion 14 has an aperture 20 which is selectively in alignment with a corresponding aperture 22 formed on a tab 24. The apertures 20,22 are used along with a socket 26 for allowing one of the externally visible components mentioned above, which in this embodiment is a headlamp (not shown), to be attached to the bracket member 10. When the apertures 20,22 are aligned, the aperture 20 and corresponding aperture 22 will receive a protrusion having a detent (not shown) from the headlamp. Once inserted, the tab 24 is moved in the slot 12 so as to offset the aperture 20 from the corresponding aperture 22 of the tab 24. When the tab 24 is moved in the slot 12, the aperture 22 becomes offset from the aperture 20, and the aperture 22 has a narrow portion 28 which engages the detent of the headlamp. The headlamp also includes a ball (not shown) which is inserted into the socket 26, allowing for the position of the headlamp to be changed, and compensate for various tolerances. Once the protrusion is inserted through the apertures 20,22, and the ball is inserted into the socket 26, headlamp is secured to the bracket member 10.

The bracket member 10 is attached to other components used for supporting various body panels through the use of fasteners, such as bolts, screws, rivets, or the like, inserted through a set of apertures 36 formed as part of the bracket member 10.

Other components used for supporting the front fascia or the fender are connected to the bracket member 10 through the use of a lower bracket 38 through the use of a snap-fit connection, which allows for pivoting about the bracket 38.

Referring to the Figures generally, the bracket member 10 also includes a tolerance adjusting attachment, generally shown at 40. The adjustment attachment 40 includes a support aperture 42 formed as a portion of the bracket member 10. The support aperture 42 is part of a first wall portion 44, which is substantially perpendicular to a second wall portion 46 and a third wall portion 48. The second and third wall portions are also referred to as side wall portions 46,48. Perpendicular to both the side wall portions 46,48 and the first wall portion 44 are an upper wall portion 50, and a lower wall portion 52. The side wall portions 46,48, upper wall portion 50, and lower wall portion 52 form a box member, generally shown at 54. The second wall portion 46 and third wall portion 48 include upper and lower slots 56,58 respectively, which are formed as part of the second wall portion 46, and the third wall portion 48, respectively.

The adjustment attachment 40 also includes an adjuster core, generally shown at 60 and an adjuster clip, generally shown at 62. The adjuster core 60 includes a first box section 64 having rack features 66, and a second box section, generally shown at 68. The adjuster core 60 also includes a core aperture 70 which is optionally threaded and extends through both the first box section 64 and the second box section 68, as shown in FIGS. 1, 3, 4, 9A, and 11-12, allowing for a fastener 72, such as a bolt or screw, to be inserted therethrough. The first box section 64 includes two side wall portions 74,76 which are connected to two more side wall portions 78,80 upon which the rack features 66 are mounted. The first box section 64 also includes a limit stop 82 which limits the movement of the adjuster core 60 through the support aperture 42 when the adjuster clip 62 is used, the function of which will be described later.

The second box section 68 includes a first wall member 84 connected to the first box section 64, a second wall member 86, a third wall member 88, and a fourth wall member 90. There is space between the wall members 84,86,88,90 such that a box aperture 92 is formed.

The adjuster clip 62 includes a generally U-shaped body portion 94 which has a first leg 96 and a second leg 98. Both the first leg 96 and the second leg 98 have inner surfaces 100,102 which include rack features 104 which correspond to the rack features 66 of the adjuster core 60 when the adjuster clip 62 slides into the slots 56,58. The leg 96 has a first pair of attachment fingers 106, and the other leg 98 has a second pair of attachment fingers 108. Each pair of fingers 106,108 also includes a set of snap features 110 and a set of engagement tabs 112 which prevent the adjuster clip 62 from easily becoming detached from the bracket member 10 when the adjuster clip 62 is inserted through the first and second sets of slots 56,58. The adjuster clip 62 also includes a preliminary engagement member, or small tooth 114 which initially engages the rack feature 66 of the adjuster core 60 when the adjuster clip 62 is inserted into the first and second slot 56,58. Also included as part of the adjuster core 60 are a pair of protrusions 116 which support the adjuster clip 62 as the adjuster clip 62 slides into the first and second sets of slots 56,58.

Figure 9A:
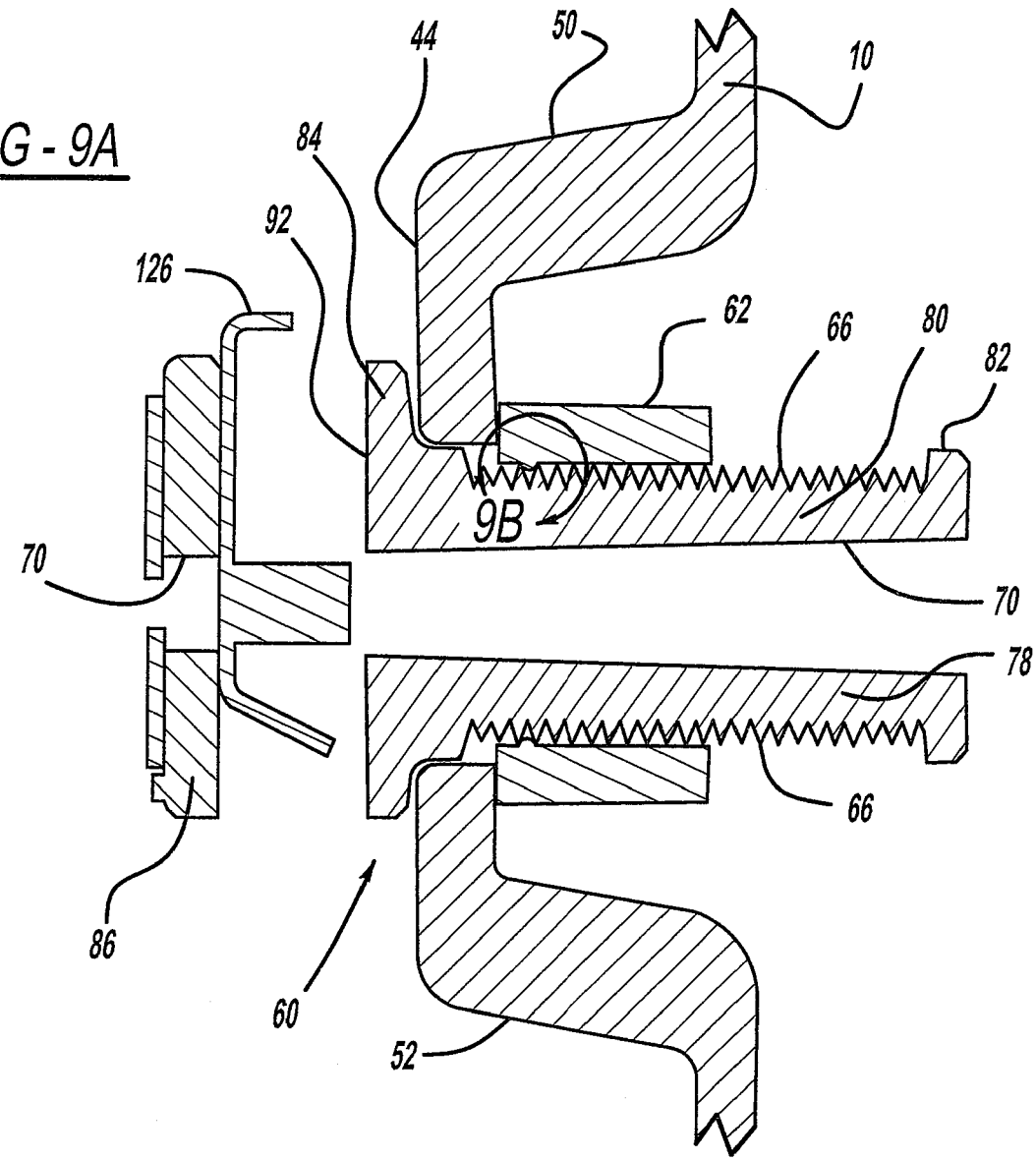
FIG. 9A is a sectional side view of a tolerance adjusting attachment having an adjuster clip in a first position, according to the present invention.
Figure 9B:
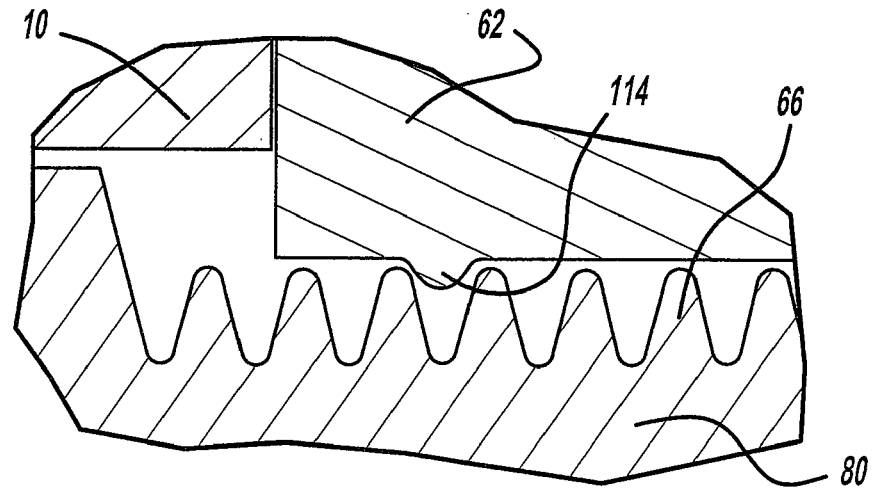
FIG. 9B is an enlarged view of the circled portion of FIG. 9A.
Figure 10A:
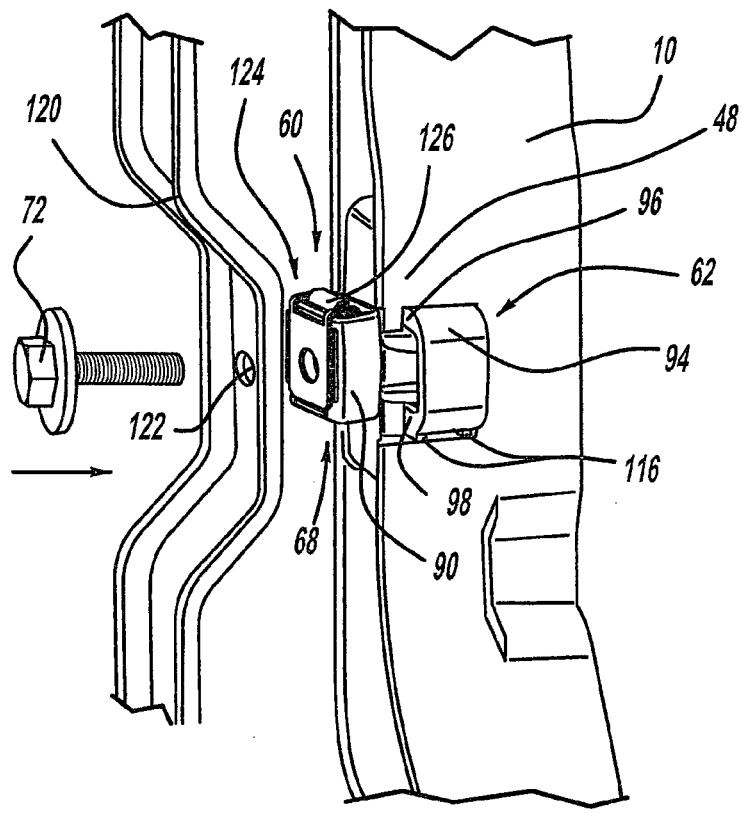
FIG. 10A is a side view of a fastener aligned with the aperture of a structural member and a tolerance adjuster having an adjuster clip in a first position, according to the present invention.
Figure 10B:
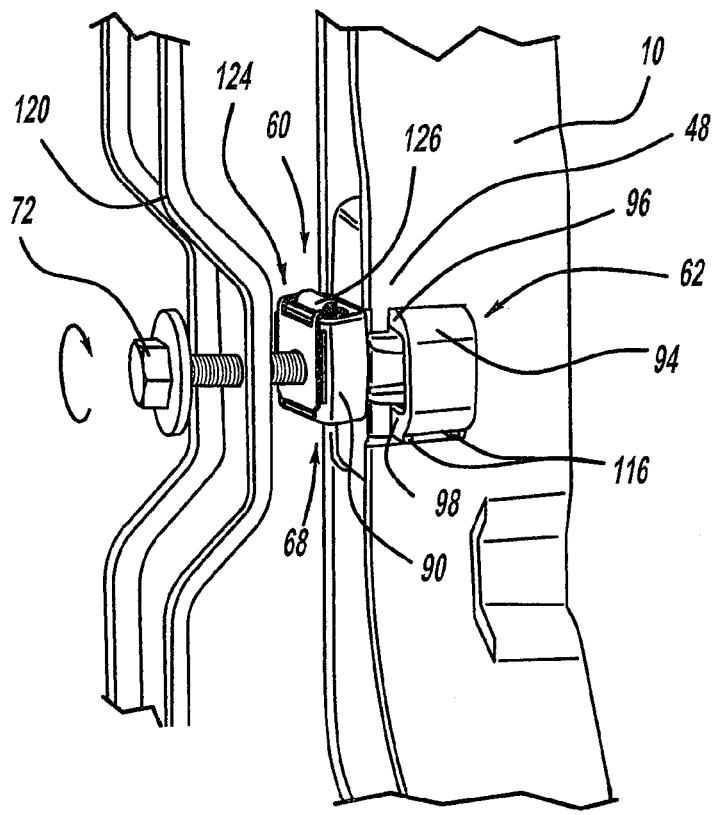
FIG. 10B is a side view of a fastener partially inserted into the aperture of a structural member and a tolerance adjuster having an adjuster clip in a first position, according to the present invention.
Figure 10C:
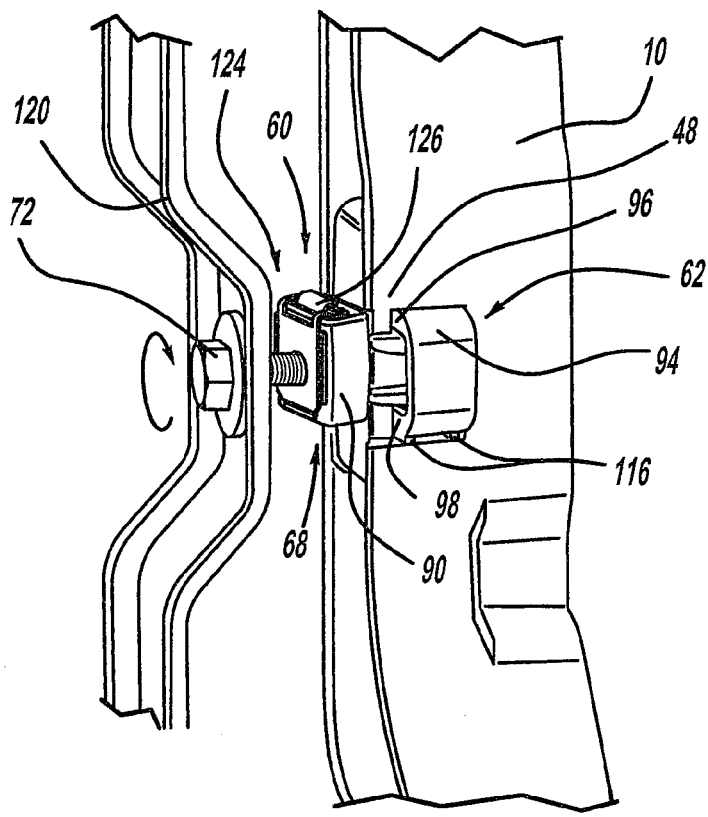
FIG. 10C is a side view of a fastener further inserted into the aperture of a structural member and a tolerance adjuster having an adjuster clip in a first position, according to the present invention.
Figure 10D:
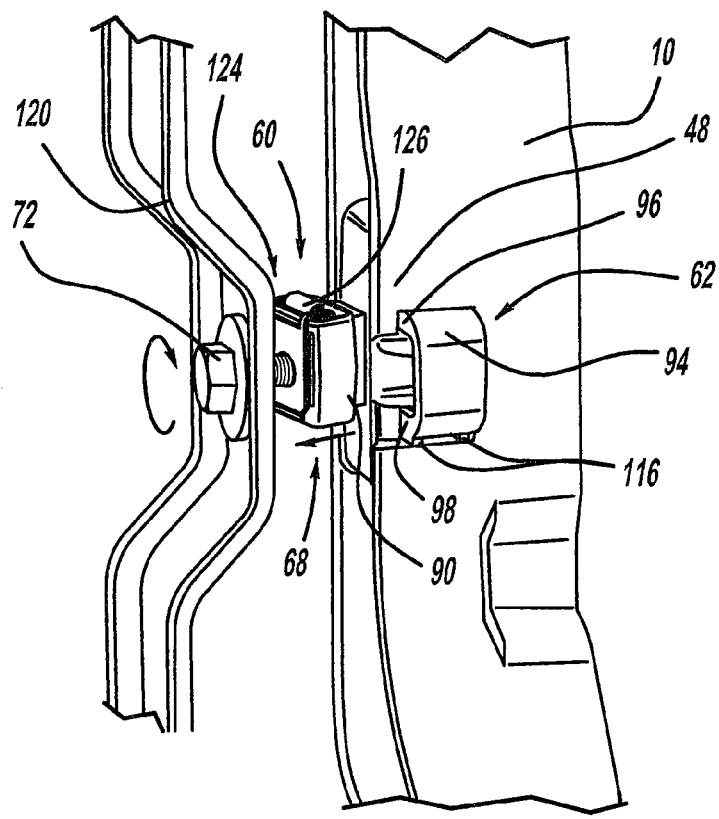
FIG. 10D is a side view of a fastener fully inserted through the aperture of a structural member such that the adjuster core is partially drawn out of the bracket member, according to the present invention.
Figure 10E:
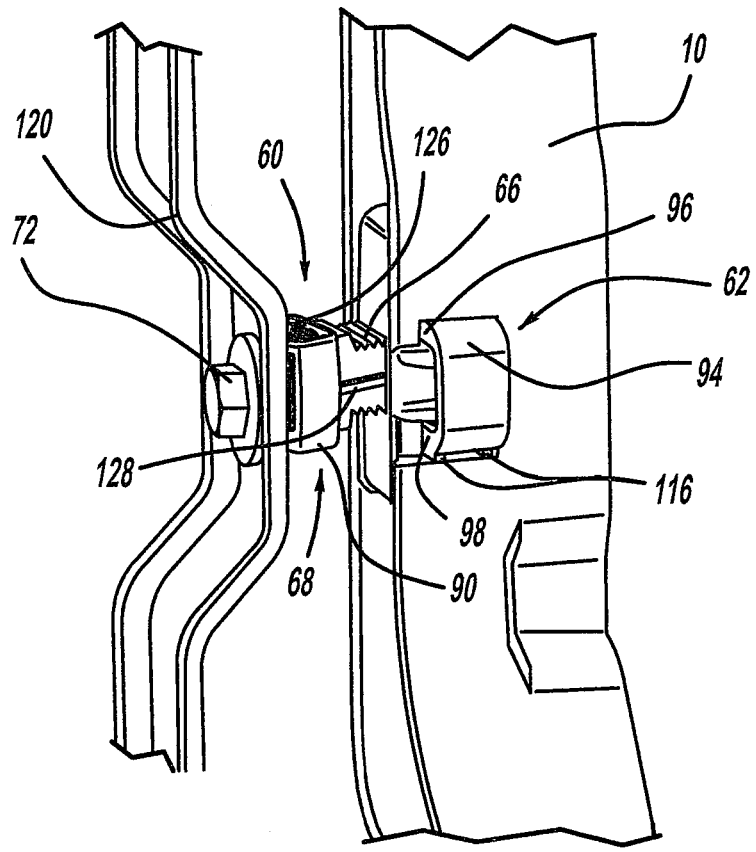
FIG. 10E is a side view of a fastener fully inserted into the aperture of a structural member such that the adjuster core of a tolerance adjusting attachment is in contact with the frame member, according to the present invention.
Figure 10F:
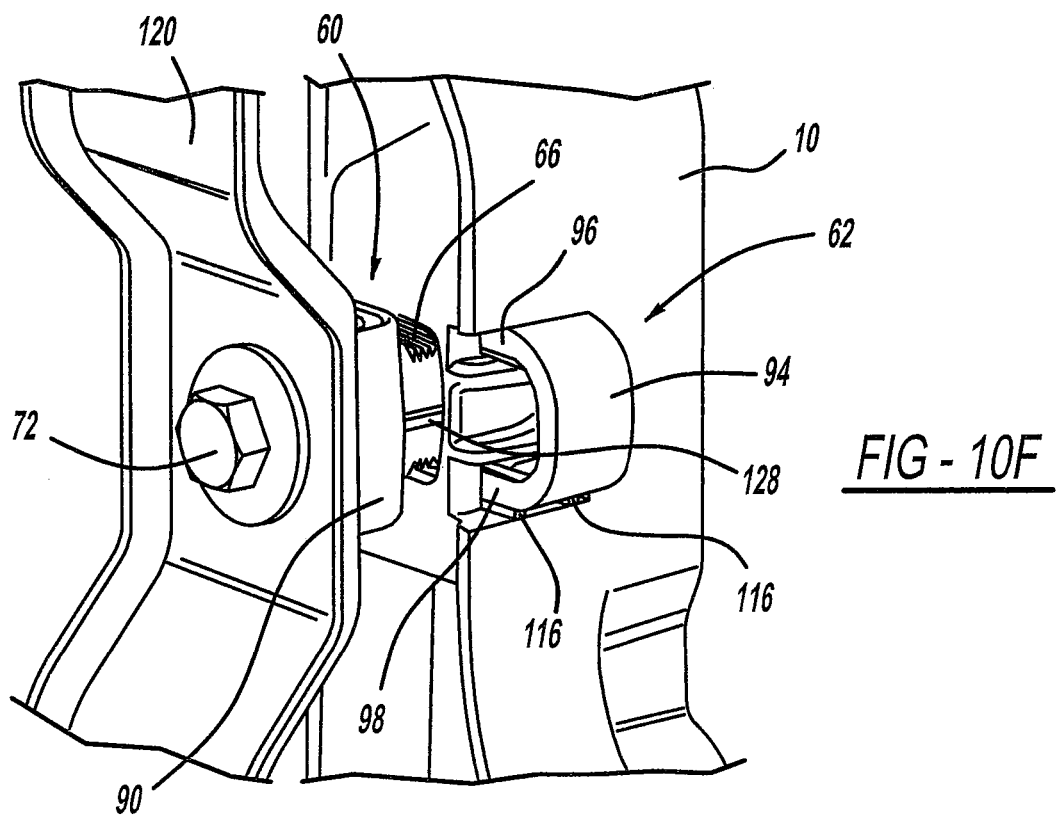
FIG. 10F is a perspective view of a fastener fully inserted into the aperture of a structural member such that the adjuster core of a tolerance adjusting attachment is in contact with the frame member, with an adjuster clip being further inserted through a bracket member, according to the present invention.
Figure 11:
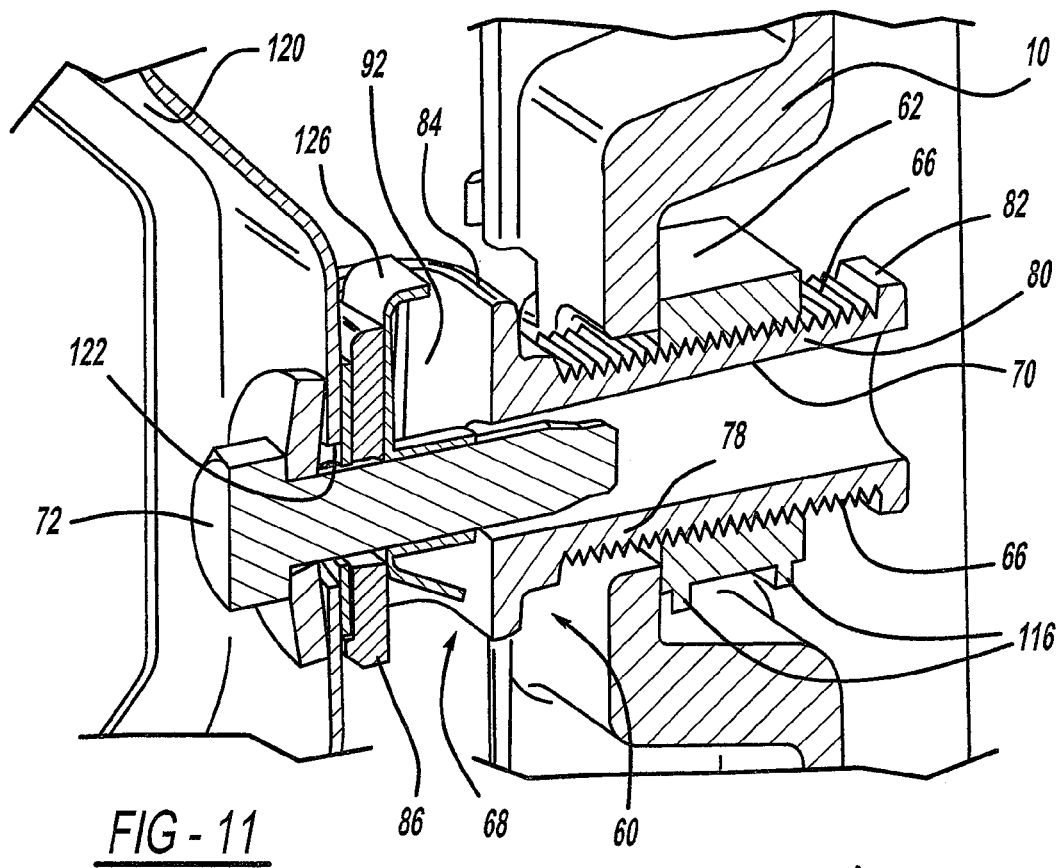
FIG. 11 is a first sectional perspective view of a tolerance adjusting attachment having the adjuster clip in a second position, according to the present invention.
Figure 12:
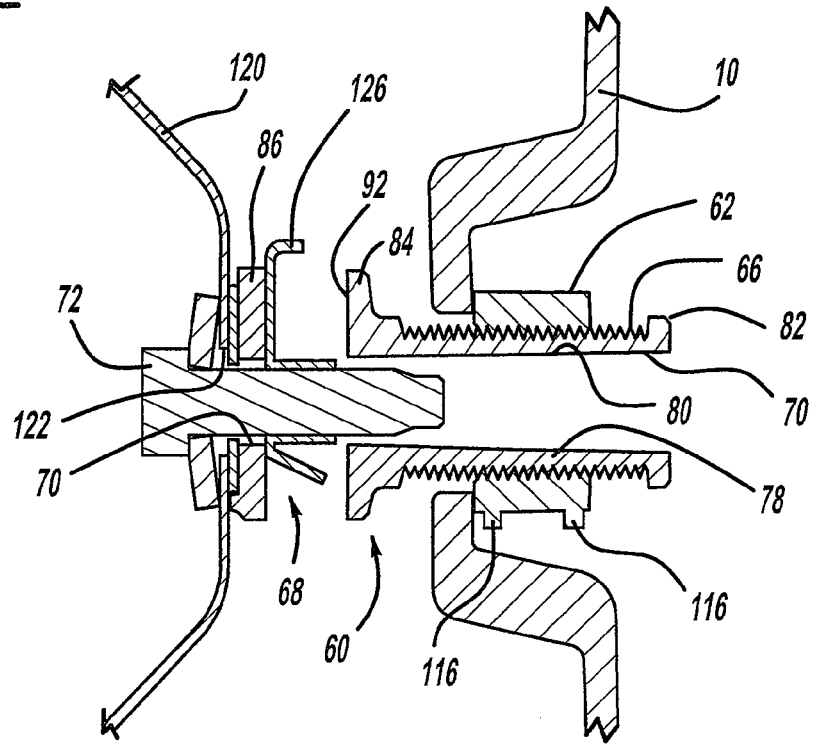
FIG. 12 is a sectional side view of a tolerance adjusting attachment having the adjuster clip in a second position, according to the present invention.
Figure 13:
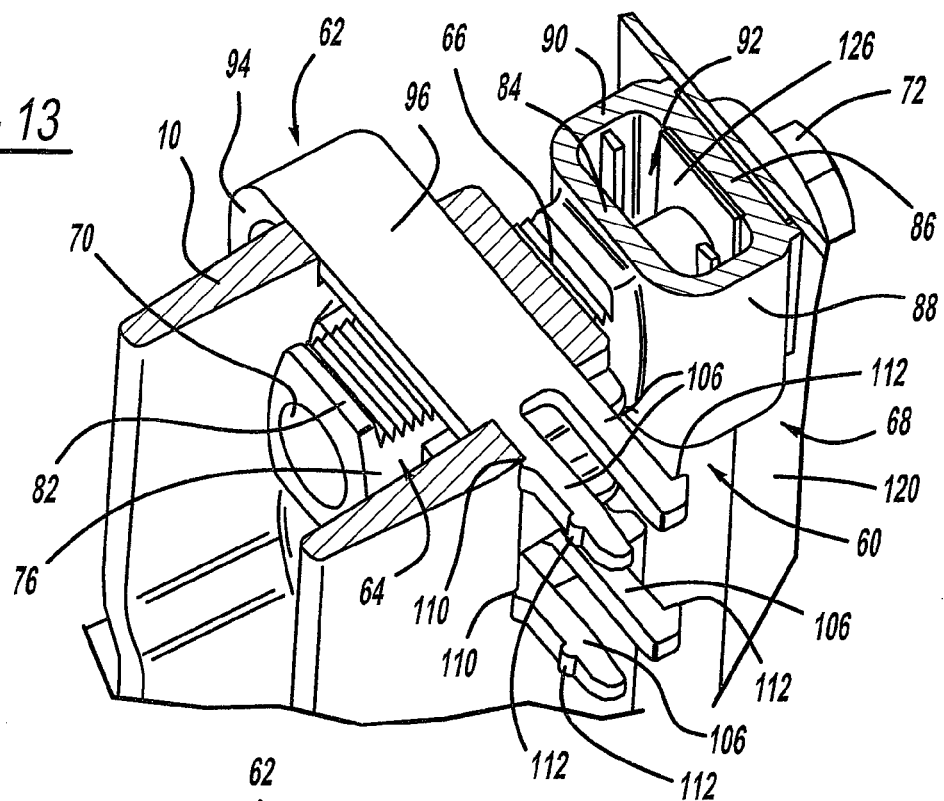
FIG. 13 is a second sectional perspective view of a tolerance adjusting attachment having the adjuster clip in a second position, according to the present invention.
Figure 14:
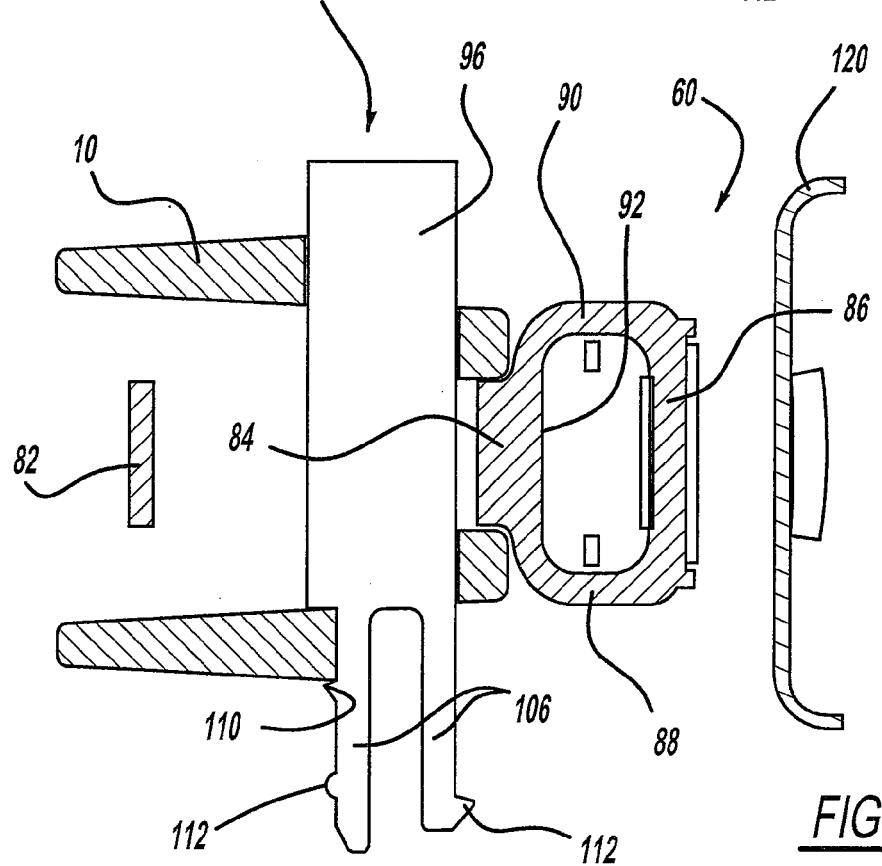
FIG. 14 is a sectional top view of a tolerance adjusting attachment having the adjuster clip in a second position, according to the present invention.

During assembly, the tolerance adjusting attachment 40 is used for attaching the bracket member 10 to a structural member, such as a frame member 120 having an aperture 122. The adjuster core 60 is inserted through the support aperture 42, and is free to move within the support aperture 42. Once this occurs, the adjuster clip 62 is inserted through the upper and lower slots 56,58 to a first position, shown in FIGS. 6-7, and 10A-10D, such that the first leg 96 and attachment fingers 106 are inserted through the upper slots 56, and the second leg 98 and attachment fingers 108 are inserted through the lower slots 58. However, in the first position, the first leg 96 and second leg 98 are only inserted through the slots 56,58 until the engagement tabs 112 contact the outside of the second wall portion 46, and only the small tooth 114 is engaged with the rack feature 66 of the adjuster core 60, as best seen in FIGS. 9A and 9B.

As shown in FIGS. 10A-10D, there is a gap, shown generally at 124, which is located between the adjuster core 60 and the frame member 120. The bolt, screw or other suitable fastener 72 is then inserted through the aperture 122 of the frame member 120 and the core aperture 70 of the adjuster core 60. As the bolt 72 is rotated in the core aperture 70, the adjuster core 60 will move in the support aperture 42 toward the frame member 120 such that the second box section 68 of the adjuster core 60 contacts the frame member 120, as shown in FIGS. 10E-14. The bolt or fastener 72 will then be tightened. The engagement between the small tooth 114 and the rack feature 66 will provide enough resistance to keep the adjuster core 60 secured while in transit toward the frame member 120, but will allow the adjuster core 60 to move in the support aperture 42 such that the gap 124 is eliminated. It should be noted that the limit stop 82 will only allow the adjuster core 60 to be moved so far in the support aperture 42 before the limit stop 82 will contact the adjuster clip 62, preventing further movement of the adjuster core 60. This can best be seen in FIGS. 9A and 11-13.

Once the fastener 72 is tightened, the attachment fingers 106,108 are further inserted through the slots 56,58 such that the snap features 110 contact the outside of the second wall portion 46, thereby retaining the adjuster clip 62 in place, and placing the adjuster clip 62 in a second position. Also, as the adjuster clip 62 is inserted through the upper and lower slots 56,58 such that the rack features 104 of the adjuster clip 62 engage with the rack features 66 of the adjuster core 60, the adjuster core 60 is prevented from moving relative to the rest of the bracket member 10, best seen in FIGS. 11-14.

While one specific configuration of the bracket member 10 and tolerance adjusting attachment 40 has been shown, the bracket member 10 and the tolerance adjusting attachment 40 are made through a forming process, such as injection molding, and can be made to fit any type of vehicle having any type of fascia or top cap.

The tolerance adjusting attachment 40 can also optionally include a U-nut 126, which is partially inserted into the box aperture 92 of the adjuster core 60. The U-nut 126 will also include a threaded surface that is used with the fastener 72 as the fastener 72 is inserted into the core aperture 70.

Furthermore, as the tolerance adjusting attachment 40 is assembled and the adjuster core 60 is secured to the frame member 120, torque is generated by the fastener 72 being rotated in the core aperture 70. The adjuster core 60 includes a set of ribs 128. Each of the side wall portions 74,76 includes a rib 128, and there is also a corresponding groove 130 formed as part of the second wall portion 46 and third wall portion 48, respectively. When the adjuster core 60 is disposed in the support aperture 42, the ribs 128 will be located in the corresponding grooves 130, and will allow the adjuster core 60 to move within the aperture 42 toward the frame member 120 as described above. As the fastener 72 is tightened, the ribs 128 and the grooves 130 will help to absorb the torque applied to the core 60, and help to reduce the torque the rack features 66 on the adjuster core 60 apply to the rack features 104 on the surfaces 100,102 of the clip 62.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tolerance adjusting attachment which is part of a bracket member used for providing proper alignment between more than one externally visible component, comprising:

a support aperture formed as a portion of said bracket member;

an adjuster core at least partially extending through said support aperture, said adjuster core selectively connectable with at least one structural member for providing a connection between and compensating for a variation in position of said bracket member in relation to said at least one structural member;

an adjuster clip at least partially extending through and movable through a portion of said bracket member such that said adjuster clip is selectively engageable with said adjuster core to secure the position of said adjuster core relative to said bracket member, and the position of said bracket member is therefore secured relative to said at least one structural member; and a box member formed as part of said bracket member, comprising:

a first wall portion, said support aperture formed as part of said first wall portion;

a second wall portion substantially perpendicular to said first wall portion;

a third wall portion substantially perpendicular to said first wall portion;

at least two upper slots, one of said at least two upper slots extends through said second wall portion, and another of said at least two upper slots extends through said third wall portion; and at least two lower slots, one of said at least two lower slots extends through said second wall portion, and another of said at least lower upper slots extends through said third wall portion.

2. The tolerance adjusting attachment of claim 1, wherein said adjuster clip further comprises:

a U-shaped body portion having a first leg and a second leg;

a first set of attachment fingers, said first set of attachment fingers formed as a portion of said first leg;

a second set of attachment fingers, said second set of attachment fingers formed as a portion of said second leg;

a set of snap features selectively engaged with said bracket member, at least one of said set of snap features formed as a portion of one of said first set of attachment fingers, and at least one of said set of snap features formed as a portion of one of said second set of attachment fingers; and a set of engagement tabs selectively engaged with said bracket member, at least one of said set of engagement tabs formed as a portion of one of said first set of attachment fingers, and at least one of said set of engagement tabs formed as a portion of one of said second set of attachment fingers.

3. The tolerance adjusting attachment of claim 2, said first set of attachment fingers extending through said at least two upper slots and said second set of attachment fingers extending through said at least two lower slots such that said adjuster clip is movable between a first position and a second position such that said set of engagement tabs will contact said bracket member when said adjuster clip is in said first position, and said set of snap features will contact said bracket member when said adjuster clip is in said second position, maintaining the position of said core adjuster relative to said bracket member, and said set of snap features to substantially prevent said adjuster clip from becoming detached from said bracket member.

4. A tolerance adjusting attachment which is part of a bracket member used for providing proper alignment between more than one externally visible component, comprising:
- a support aperture formed as a portion of said bracket member;
- an adjuster core at least partially extending through said support aperture, said adjuster core selectively connectable with at least one structural member for providing a connection between and compensating for a variation in position of said bracket member in relation to said at least one structural member;
- an adjuster clip at least partially extending through and movable through a portion of said bracket member such that said adjuster clip is selectively engageable with said adjuster core to secure the position of said adjuster core relative to said bracket member, and the position of said bracket member is therefore secured relative to said at least one structural member; and
- said adjuster core, further comprising:
  - a first box section at least partially extending through said support aperture;
  - a second box section connected to said first box section; and
  - a core aperture extending through said first box section and said second box section such that a fastener is operable with said core aperture to adjust the position of said adjuster core relative to both of said bracket member and said at least one structural member.

5. The tolerance adjusting attachment of claim 4, said first box section further comprising:
- a first side wall portion;
- a second side wall portion substantially parallel to said first side wall portion;
- a third side wall portion connected to said first side wall portion and said second side wall portion; and
- a fourth side wall portion connected to said first side wall portion and said second side wall portion, and substantially parallel to said third side wall portion.

6. The tolerance adjusting attachment of claim 4, said second box section further comprising:
- a first wall member connected to said first box section;
- a second wall member substantially parallel to said first wall member, said core aperture extending through said first wall member and said second wall member;
- a third wall member connected to and substantially perpendicular to said first wall member and said second wall member; and
- a fourth wall member connected to and substantially perpendicular to said first wall member and said second wall member, said fourth wall member substantially parallel to said third wall member.

7. The tolerance adjusting attachment of claim 4, further comprising:
- at least one rack feature mounted on said adjuster core; and
- at least one rack feature mounted on said adjuster clip such that as said adjuster clip extends through said bracket member, said at least one rack feature mounted on said adjuster core will engage said at least one rack feature mounted on said adjuster clip.

8. The tolerance adjusting attachment of claim 7, said adjuster core further comprising a limit stop for limiting the amount of movement of said adjuster core toward said at least one structural member through said support aperture when said adjuster clip is inserted through said bracket member.

9. The tolerance adjusting attachment of claim 7, further comprising a preliminary engagement member which engages said at least one rack feature mounted on said adjuster core, and will provide resistance during the movement of said adjuster core as the position of said adjuster core is changed relative to said bracket member and said at least one structural member, and said preliminary engagement member will temporarily maintain the position of said adjuster core relative to said bracket member and said at least one structural member until said at least one rack feature mounted on said adjuster core is engaged with said at least one rack feature mounted on said adjuster clip.

10. A tolerance adjusting attachment which is part of a bracket member used for providing proper alignment between more than one externally visible component, comprising:
- a support aperture formed as a portion of said bracket member;
- an adjuster core at least partially extending through said support aperture, said adjuster core selectively connectable with at least one structural member for providing a connection between and compensating for a variation in position of said bracket member in relation to said at least one structural member;
- an adjuster clip at least partially extending through and movable through a portion of said bracket member such that said adjuster clip is selectively engageable with said adjuster core to secure the position of said adjuster core relative to said bracket member, and the position of said bracket member is therefore secured relative to said at least one structural member;
- at least one rib formed at part of said adjuster core; and
- at least one groove formed as part of said support aperture, wherein as said adjuster core is inserted into said support aperture, said at least one rib is slidably disposed in said at least one groove to be operable for preventing the rotation of said adjuster core in said support aperture.

11. A tolerance adjusting attachment which compensates for dimensional variations in at least one externally visible component, comprising:
- a bracket member having a support aperture formed therein;
- at least two upper slots formed as a portion of said bracket member;
- at least two lower slots formed as a portion of said bracket member;
- an adjuster core having a first box section, and a second box section connected to said first box section, said adjuster core at least partially extending through said support aperture;
- at least one structural member operable with said adjuster core such that said adjuster core is movable within said support aperture to compensate for variation in position between said bracket member and said at least one structural member; and
- an adjuster clip moveable between a first position and a second position in said at least two upper slots and said at least two lower slots such that when said adjuster core is in said first position, said adjuster clip will provide resistance to said adjuster core as said adjuster moves in said support aperture, and when said adjuster clip is in said second position, the position of said adjuster clip and said adjuster core is secured relative to said bracket member.

12. The tolerance adjusting attachment of claim 11, said bracket member having a box member, said box member comprising:
- a first wall portion, said support aperture extending through said first wall portion;
- a second wall portion connected to and substantially perpendicular to said first wall portion, at least one of said at least two upper slots being formed as part of said second wall portion, and at least one of said at least two lower slots being formed as part of said second wall portion; and
- a third wall portion connected to said first wall portion and substantially perpendicular to said first wall portion, at least one of said at least two upper slots being formed as part of said third wall portion, and at least one of said at least two lower slots being formed as part of said third wall portion.

13. The tolerance adjusting attachment of claim 11, said adjuster clip further comprising:
- a U-shaped body portion;
- a first leg connected to said U-shaped body portion, said first leg having a first set of attachment fingers;
- a second leg connected to said U-shaped body portion, said second leg having a second set of attachment fingers;
- a plurality of snap features, a portion of said plurality of snap features formed as part of said first set of attachment fingers, and another portion of said plurality of snap features formed as part of said second set of attachment fingers; and
- a plurality of engagement tabs, a portion of said plurality of engagement tabs formed as part of said first set of attachment fingers, and another portion of said plurality of engagement tabs formed as part of said second set of attachment fingers.

14. The tolerance adjusting attachment of claim 13, wherein as said adjuster clip is moved to said first position, said first set of attachment fingers and said second set of attachment fingers will extend through said at least two upper slots and said at least two lower slots such that said plurality of engagement tabs will contact said bracket member, substantially maintaining the position of said adjuster clip in said at least two upper slots and said at least two lower slots.

15. The tolerance adjusting attachment of claim 13, wherein as said adjuster clip is moved to said second position, said first set of attachment fingers and said second set of attachment fingers will extend through said at least two upper slots and said at least two lower slots such that said plurality of snap features will contact said bracket member, substantially preventing the removal of said adjuster clip from said at least two upper slots and said at least two lower slots.

16. The tolerance adjusting attachment of claim 11, said first box section further comprising:
- a first side wall portion substantially parallel to a second side wall portion;
- a third side wall portion substantially parallel to a fourth side wall portion, said third side wall portion connected to said first side wall portion and said second side wall portion, and said fourth side wall portion connected to said first side wall portion and said second side wall portion; and
- a limit stop formed as a portion of two of said first side wall portion, said second side wall portion, said third side wall portion, and said fourth side wall portion, and said second box section is connected to an end of each of said first side wall portion, said second side wall portion, said third side wall portion, and said fourth side wall portion.

17. The tolerance adjusting attachment of claim 11, said second box section further comprising:
- a first wall member, said first box section connected to and substantially perpendicular to said first wall member;
- a second wall member substantially parallel to said first wall member at a distance away from said first wall member;
- a third wall member formed as a portion of and connected to both of said first wall member and said second wall member, said third wall member substantially perpendicular to said first wall member, and said second wall member; and
- a fourth wall member formed as a portion of and connected to both of said first wall member and said second wall member such that said fourth wall member is substantially perpendicular to said first wall member and said second wall member, and substantially parallel to and a distance away from said third wall member.

18. The tolerance adjusting attachment of claim 11, further comprising:
- a plurality of rack features, a series of said plurality of rack features mounted on said first box section of said adjuster core, and another series of said plurality of rack features mounted on said adjuster clip; and
- a preliminary engagement member mounted on said adjuster clip such that said preliminary engagement member is engaged with said series of said plurality of rack features formed on said adjuster core when said adjuster clip is in said first position.

19. The tolerance adjusting attachment of claim 18, further comprising said series of said plurality of rack features on said adjuster core to be engaged with said series of plurality of rack features on said adjuster clip when said adjuster clip is in said second position, substantially restricting the movement of said adjuster core in said support aperture.

20. The tolerance adjusting attachment of claim 11, further comprising:
- a core aperture extending through said first box section and said second box section; and
- a fastener selectively inserted into said core aperture such that as said fastener secures said adjuster core to said at least one structural member, said adjuster core will move in said support aperture.

21. The tolerance adjusting attachment of claim 11, further comprising:
- at least one rib formed at part of said adjuster core; and
- at least one groove formed as part of said support aperture, wherein as said adjuster core is inserted into said support aperture, said at least one rib is slidably disposed in said at least one groove to be operable for preventing the rotation of said adjuster core in said support aperture.

22. A bracket having tolerance adjusting attachment which compensates for dimensional variations in at least one externally visible component, said tolerance adjusting attachment comprising:
- a support aperture extending through said bracket member, said support aperture operable for receiving at least a portion of said tolerance adjusting attachment;
- a box member having a first wall portion, a second wall portion, and a third wall portion formed as a portion of said bracket member, said support aperture extending through said first wall portion of said box member;
- at least two upper slots extending through said second wall portion and said third wall portion of said box member;
- at least two lower slots extending through said second wall portion and said third wall portion of said box member;

an adjuster core having a first box section connected to a second box section such that said first box section at least partially extends into said support aperture, and said second box section is selectively connected to at least one structural member;

an adjuster clip having a first leg which includes an inner surface, and a second leg which includes an inner surface, said first leg and said second leg connected to a U-shaped body portion, said adjuster clip movable between a first position and a second position; and a plurality of rack features, a portion of said plurality of rack features formed as a portion of said first box section, and a portion of said plurality of rack features formed on said inner surface of said first leg and said inner surface of said second leg.

23. The tolerance adjusting attachment of claim 22, further comprising said adjuster clip to be in said first position such that said adjuster core is moveable in said support aperture to come in contact with said at least one structural member and become secured to said at least one structural member.

24. The tolerance adjusting attachment of claim 22, further comprising said adjuster core to be in said second position, such that said portion of said plurality of rack features formed as a portion of said first box section is engaged with said portion of said plurality of rack features formed on said inner surface of said first leg and said inner surface of said second leg securing the position of said adjuster core in relation to said bracket.

25. The tolerance adjusting attachment of claim 22, further comprising:
a core aperture extending through said first box section and said second box section;
an aperture formed as part of said at least one structural member; and
a fastener operable for being inserted through said aperture into said core aperture such that when said adjuster clip is in said first position, said fastener will cause said adjuster core to move toward and come in contact with said at least one structural member, securing said adjuster core to said at least one structural member.

26. The tolerance adjusting attachment of claim 22, further comprising:
a first set of attachment fingers formed as a portion of said first leg;
a second set of attachment fingers formed as a portion of said second leg;
a series of snap features, a portion of said series of snap features formed on said first set of attachment fingers, and a portion of said series of snap features formed on said second set of attachment fingers; and
a series of engagement tabs, a portion of said series of snap features formed on said first set of attachment fingers, and a portion of said series of snap features formed on said second set of attachment fingers.

27. The tolerance adjusting attachment of claim 26, wherein said series of snap features are engaged with said bracket member when said adjuster clip is in said second position, and said series of engagement tabs are engaged with said bracket member when said adjuster clip is in said first position.

28. The tolerance adjusting attachment of claim 22, said first box section of said adjuster core further comprising:
a first side wall portion;
a second side wall portion substantially aligned with and parallel to said first side wall portion;
a third side wall portion connected to and substantially perpendicular with said first side wall portion and said second side wall portion; and
a fourth side wall portion substantially parallel with said third side wall portion and connected to said first side wall portion and said second side wall portion, and said portion of said plurality of rack features formed as a portion of said first box section operable to be formed as part of any two of said first side wall portion, said second side wall portion, said third side wall portion or said fourth side wall portion.

29. The tolerance adjusting attachment of claim 22, said second box section of said adjuster core further comprising:
a first wall member, said first box section of said adjuster core connected to said first wall member;
a second wall member substantially parallel to said first wall member and operable for contacting said at least one structural member when said core adjuster is selectively connected to said at least one structural member;
a third wall member connected to and substantially perpendicular with said first wall member and said second wall member; and
a fourth wall member substantially parallel to said third wall member and connected to said first wall member and said second wall member.

30. The tolerance adjusting attachment of claim 22, said first box section of said adjuster core further comprising a limit stop, said limit stop limits the amount of movement of said adjuster core toward said at least one structural member when said adjuster clip is in said first position.

31. The tolerance adjusting attachment of claim 22, said adjuster clip further comprising a preliminary engagement member mounted on either of said first leg or said second leg and selectively engagable with said portion of said plurality of rack features formed as a portion of said first box section when said adjuster clip is in said first position, and said preliminary engagement member will provide resistance as said adjuster core is moved in said support aperture.

32. The tolerance adjusting attachment of claim 22, further comprising:
at least one rib formed at part of said first box section of said adjuster core; and
at least one groove formed as part of said support aperture, wherein as said adjuster core is inserted into said support aperture, said at least one rib is slidably disposed in said at least one groove to be operable for preventing the rotation of said adjuster core in said support aperture.

* * * * *